(12) United States Patent  
Gysling

(10) Patent No.: US 7,603,916 B2  
(45) Date of Patent: Oct. 20, 2009

(54) WET GAS METERING USING A DIFFERENTIAL PRESSURE AND A SONAR BASED FLOW METER

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 0 days.

(21) Appl. No.: 11/972,228

(22) Filed: Jan. 10, 2008

(65) Prior Publication Data

US 2008/0236298 A1   Oct. 2, 2008

Related U.S. Application Data

(63) Continuation-in-part of application No. 11/482,871, filed on Jul. 7, 2006, now Pat. No. 7,418,877.

(60) Provisional application No. 60/881,069, filed on Jan. 17, 2007, provisional application No. 60/880,266, filed on Jan. 11, 2007, provisional application No. 60/760,845, filed on Jan. 19, 2006, provisional application No. 60/759,159, filed on Jan. 12, 2006, provisional application No. 60/758,382, filed on Jan. 11, 2006, provisional application No. 60/724,952, filed on Oct. 6, 2005, provisional application No. 60/697,479, filed on Jul. 7, 2005, provisional application No. 60/762,101, filed on Jan. 24, 2006, provisional application No. 60/773,146, filed on Feb. 13, 2006, provisional application No. 60/774,706, filed on Feb. 17, 2006, provisional application No. 60/818,199, filed on Jun. 30, 2006.

(51) Int. Cl.  
*G01F 1/34* (2006.01)

(52) U.S. Cl. ................................. 73/861.42

(58) Field of Classification Search ............. 73/861.42, 73/861.27, 861.25, 861.02, 861.03  
See application file for complete search history.

(56) References Cited

U.S. PATENT DOCUMENTS 2,874,568 A   2/1959   Petermann (Continued)

FOREIGN PATENT DOCUMENTS

GB          1 208 121        10/1970

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Jewel Thompson

(57) ABSTRACT

A method and apparatus for measuring wetness of a gas flow within a conduit is provided that includes a first pressure sensor, a second pressure sensor, a sonar based flowmeter, and a processing device. The first pressure sensor is operable to sense the pressure of the gas flow within the conduit at a first position. The second pressure sensor is operable to sense the pressure of the gas flow within the conduit at a second position. The second position is located downstream of the first position an amount sufficient that the gas flow experiences a pressure drop. The sonar based flowmeter is configured to determine a volumetric flow rate of the gas flow. The processing device is in communication with the first and second pressure sensors and the sonar based flowmeter. The processing device is adapted to determine a difference in the pressure sensed by the first and second pressure sensors, and to determine the wetness of the gas flow using the difference in pressure and the volumetric flow rate.

19 Claims, 12 Drawing Sheets

U.S. PATENT DOCUMENTS

| | | | |
|---|---|---|---|
| 4,004,461 A | 1/1977 | Lynworth |
| 4,048,853 A | 9/1977 | Smith et al. |
| 4,080,837 A | 3/1978 | Alexander et al. |
| 4,195,517 A | 4/1980 | Kalinoski et al. |
| 4,248,085 A | 2/1981 | Coulthard |
| 4,445,389 A | 5/1984 | Potzick et al. |
| 4,576,043 A | 3/1986 | Nguyen |
| 4,896,540 A | 1/1990 | Shakkottai et al. |
| 5,040,415 A | 8/1991 | Barkhoudarian |
| 5,083,452 A | 1/1992 | Hope |
| 5,115,670 A | 5/1992 | Shen |
| 5,285,675 A | 2/1994 | Colgate et al. |
| 5,367,911 A | 11/1994 | Jewell et al. |
| 5,398,542 A | 3/1995 | Vasbinder |
| 5,524,475 A | 6/1996 | Kolpak et al. |
| 5,551,305 A | 9/1996 | Farchi et al. |
| 5,591,922 A | 1/1997 | Segeral et al. |
| 5,741,977 A | 4/1998 | Agar et al. |
| 5,741,980 A | 4/1998 | Hill et al. |
| 5,770,805 A | 6/1998 | Castel |
| 5,770,806 A | 6/1998 | Hiismaki |
| 5,835,884 A | 11/1998 | Brown |
| 5,856,622 A | 1/1999 | Yamamoto et al. |
| 5,948,959 A | 9/1999 | Peloquin |
| 6,134,951 A | 10/2000 | Scott |
| 6,151,958 A | 11/2000 | Letton et al. |
| 6,202,494 B1 | 3/2001 | Ricbel et al. |
| 6,354,147 B1 | 3/2002 | Gysling et al. |
| 6,378,357 B1 | 4/2002 | Han et al. |
| 6,397,684 B1 | 6/2002 | Hagenmeyer et al. |
| 6,450,037 B1 | 9/2002 | Davis et al. |
| 6,463,813 B1 | 10/2002 | Gysling et al. |
| 6,532,827 B1 | 3/2003 | Ohnishi |
| 6,536,291 B1 | 3/2003 | Gysling et al. |
| 6,558,036 B2 | 5/2003 | Davis et al. |
| 6,587,798 B2 | 7/2003 | Gysling et al. |
| 6,609,069 B2 | 8/2003 | Gysling |
| 6,691,584 B2 | 2/2004 | Gysling et al. |
| 6,698,297 B2 | 3/2004 | Gysling |
| 6,732,575 B2 | 5/2004 | Gysling et al. |
| 6,782,150 B2 | 8/2004 | Davis et al. |
| 6,813,962 B2 | 11/2004 | Gysling et al. |
| 6,837,098 B2 | 1/2005 | Gysling et al. |
| 6,862,920 B2 | 3/2005 | Gysling et al. |
| 6,889,562 B2 | 5/2005 | Gysling et al. |
| 6,898,541 B2 | 5/2005 | Gysling et al. |
| 6,945,095 B2 | 9/2005 | Johansen |
| 6,959,604 B2 | 11/2005 | Davis et al. |
| 6,971,259 B2 | 12/2005 | Gysling |
| 6,988,411 B2 | 1/2006 | Gysling et al. |
| 7,032,432 B2 | 4/2006 | Gysling et al. |
| 7,062,976 B2 | 6/2006 | Gysling et al. |
| 7,086,278 B2 | 8/2006 | Gysling et al. |
| 7,096,719 B2 | 8/2006 | Gysling |
| 7,110,893 B2 | 9/2006 | Davis et al. |
| 7,127,360 B2 | 10/2006 | Davis et al. |
| 7,134,320 B2 | 11/2006 | Banach et al. |
| 7,139,667 B2 | 11/2006 | Gysling et al. |
| 7,418,877 B2 * | 9/2008 | Gysling ............ 73/861.42 |
| 2003/0089161 A1 | 5/2003 | Gysling |
| 2003/0136186 A1 | 7/2003 | Gysling |
| 2003/0154036 A1 | 8/2003 | Gysling et al. |
| 2004/0069069 A1 | 4/2004 | Croteau |
| 2004/0074312 A1 | 4/2004 | Gysling |
| 2004/0168522 A1 | 9/2004 | Bailey et al. |
| 2004/0168523 A1 | 9/2004 | Bailey et al. |
| 2004/0194539 A1 | 10/2004 | Gysling |
| 2004/0199340 A1 | 10/2004 | Gysling et al. |
| 2004/0226386 A1 | 11/2004 | Gysling et al. |
| 2004/0231431 A1 | 11/2004 | Bailey et al. |
| 2004/0255695 A1 | 12/2004 | Gysling et al. |
| 2005/0005712 A1 | 1/2005 | Gysling et al. |
| 2005/0011278 A1 | 1/2005 | Brown et al. |
| 2005/0011283 A1 | 1/2005 | Gysling et al. |
| 2005/0012935 A1 | 1/2005 | Kersey |
| 2005/0039520 A1 | 2/2005 | Bailey et al. |
| 2005/0044929 A1 | 3/2005 | Banach et al. |
| 2005/0120799 A1 | 6/2005 | Gysling et al. |
| 2005/0125169 A1 | 6/2005 | Loose |
| 2005/0125170 A1 | 6/2005 | Gysling |
| 2005/0159904 A1 | 7/2005 | Loose et al. |
| 2005/0171710 A1 | 8/2005 | Gysling et al. |
| 2005/0246111 A1 | 11/2005 | Gysling et al. |
| 2006/0037385 A1 | 2/2006 | Gysling |
| 2006/0037399 A1 | 2/2006 | Brown |
| 2006/0048583 A1 | 3/2006 | Gysling |
| 2006/0053869 A1 | 3/2006 | Gysling et al. |

FOREIGN PATENT DOCUMENTS

| | | |
|---|---|---|
| GB | 2 282 931 | 4/1995 |
| WO | WO 93/14382 | 7/1993 |
| WO | WO 9319347 | 9/1993 |
| WO | WO 99/67629 | 12/1999 |
| WO | WO 02/46706 | 6/2002 |
| WO | WO 03/073047 | 9/2003 |
| WO | WO 2005/040732 | 5/2005 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

U.S. Appl. No. 11/115,492, P. Rothman.

U.S. Appl. No. 11/268,815, D. Gysling et al.

"New Flowmeter Principle"—By: Walt Boyes—Published in Flow Control Magazine—Oct. 2003 Issue.

"Piezoelectric Polymers"—By: J.S. Harrison and Z. Ounaies—ICASE Report.

Piezo Film Sensors Technical Manual—Measurement Specialties, Inc. Apr. 2, 1999.

Mass Fraction Measurements in Multiphase Flows using a Clamp-on PVDF Array—Johan Carlson.

Sonar-Based Volumetric Flow Meter for Pulp and Paper Applications—By: Daniel L. Gysling & Douglas H. Loose—Dec. 3, 2002.

Sonar Based Volumetric Flow Meter for Chemical and Petrochemical Applications—By: Daniel L. Gysling & Douglas H. Loose—Feb. 14, 2003.

Clamp-On, Sonar Based Entrained Air Measurement for Pulp and Paper Applications—By: Daniel L. Gysling & Douglas H. Loose—Jan. 24, 2003.

"Flow Velocity Measurement using Spatial Filter" By: Yoshio Kurita, Takaharu Matsumoto and Yukitake Shibata, Nov. 1979.

* cited by examiner

WET GAS METERING USING A DIFFERENTIAL PRESSURE AND A SONAR BASED FLOW METER

CROSS-REFERENCE TO RELATED PATENT APPLICATIONS

This application claims the benefit of U.S. Provisional Patent Application No. 60/881,069 filed Jan. 17, 2007, U.S. Provisional Patent Application No. 60/880,266 filed Jan. 11, 2007, and is a continuation-in-part of U.S. patent application Ser. No. 11/482,871 filed Jul. 7, 2006, now U.S. Pat. No. 7,418,877 which application claims priority to U.S. Provisional Patent Application No. 60/760,845 filed Jan. 19, 2006, U.S. Provisional Patent Application No. 60/759,159 filed Jan. 12, 2006; U.S. Provisional Patent Application No. 60/758,382 filed Jan. 11, 2006; U.S. Provisional Patent Application No. 60/724,952 filed Oct. 6, 2005; U.S. Provisional Patent Application No. 60/697,479 filed Jul. 7, 2005, U.S. Provisional Patent Application No. 60/762,101 filed Jan. 24, 2006; U.S. Provisional Patent Application No. 60/773,146 filed Feb. 13, 2006, U.S. Provisional Patent Application No. 60/774,706 filed Feb. 17, 2006; and U.S. Provisional Patent Application No. 60/818,199 filed Jun. 30, 2006, all of which are incorporated by reference herein in their entirety.

BACKGROUND OF THE INVENTION

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture. In certain flow processes, such as those found in the oil and gas industries, it is desirable to separate the liquid (e.g., oil and/or water) and the gas (e.g., air) components of the fluid. This is typically accomplished using a separator, which is an item of production equipment used to separate liquid components of the fluid stream from gaseous components. The liquid and gas components flow from the separator in separate legs (pipes), with the leg containing the gas component referred to as the "gas leg" and the leg containing the liquid component referred to as the "liquid leg". Each of the legs typically includes a flow meter to determine the volumetric flow rate for each of the gas and the fluid components, respectively, wherein the volumetric flow rate for the gas leg is commonly measured using an orifice plate.

As is well known in oil and gas production, a carry-over of liquid into the gas leg of the gas/liquid separator commonly occurs, wherein the liquid typically takes the form of a mist comprised of small liquid droplets, commonly know as wet gas. This is undesirable because the liquid carry-over can result in a host of undesirable events depending in large part on the degree of carry-over that takes place. As such, in order to minimize the amount of liquid carry-over most separators have mist catchers designed to recover the liquid carried over. Unfortunately however, accurate measurements of the amount of liquid carry-over have not been obtainable because devices and/or methods for accurately determining the amount of liquid carried over into the gas leg do not currently exist. As such, there is a need for an apparatus and method to accurately measure the amount of liquid carry-over.

SUMMARY OF THE INVENTION

An apparatus for measuring wetness of a wet gas flow or mixture is provided, wherein the apparatus includes a differential pressure based flow meter configured to determine a first volumetric flow rate of the wet gas flow. The apparatus also includes a second flow meter having an array of sensors configured to determine a second volumetric flow rate of the wet gas flow. Furthermore, the apparatus includes a processing device communicated with at least one of the differential pressure base flow meter and the second flow meter, wherein the processing device is configured to determine at least one of the wetness of the wet gas flow, the volumetric flow of the liquid portion of the wet gas flow, and the volumetric flow of the gas portion of the wet gas flow using the first and second volumetric flow rates.

Moreover, a method of measuring the wetness of a wet gas flow or mixture is provided, wherein the method includes determining a first volumetric flow rate of the wet gas flow responsive to a differential pressure in the wet gas flow. The method further includes determining a second volumetric flow rate of the wet gas flow responsive to the unsteady pressures caused by coherent structures convecting with the gas flow. Additionally, the method includes processing the first volumetric flow rate and the second volumetric flow rate to determine at least one of the wetness of the wet gas flow, the volumetric flow of the liquid portion of the wet gas flow, and the volumetric flow of the gas portion of the wet gas flow.

Furthermore, an apparatus for measuring a parameter of a wet gas flow is provided, wherein the apparatus includes a first metering device for measuring a differential pressure, wherein the first metering device is configured to determine a first characteristic of the wet gas flow, the first characteristic being sensitive to wetness of the wet gas flow. The apparatus also includes a second metering device, wherein the second metering device is configured to determine a second characteristic of the wet gas flow, the second characteristic being relatively insensitive to wetness of the wet gas flow. Additionally, the apparatus includes a processing device communicated with at least one of the first metering device and the second metering device, wherein the processing device is configured to determine the parameter of the wet gas flow using the first and second characteristic.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike.

DETAILED DESCRIPTION

Figure 1:
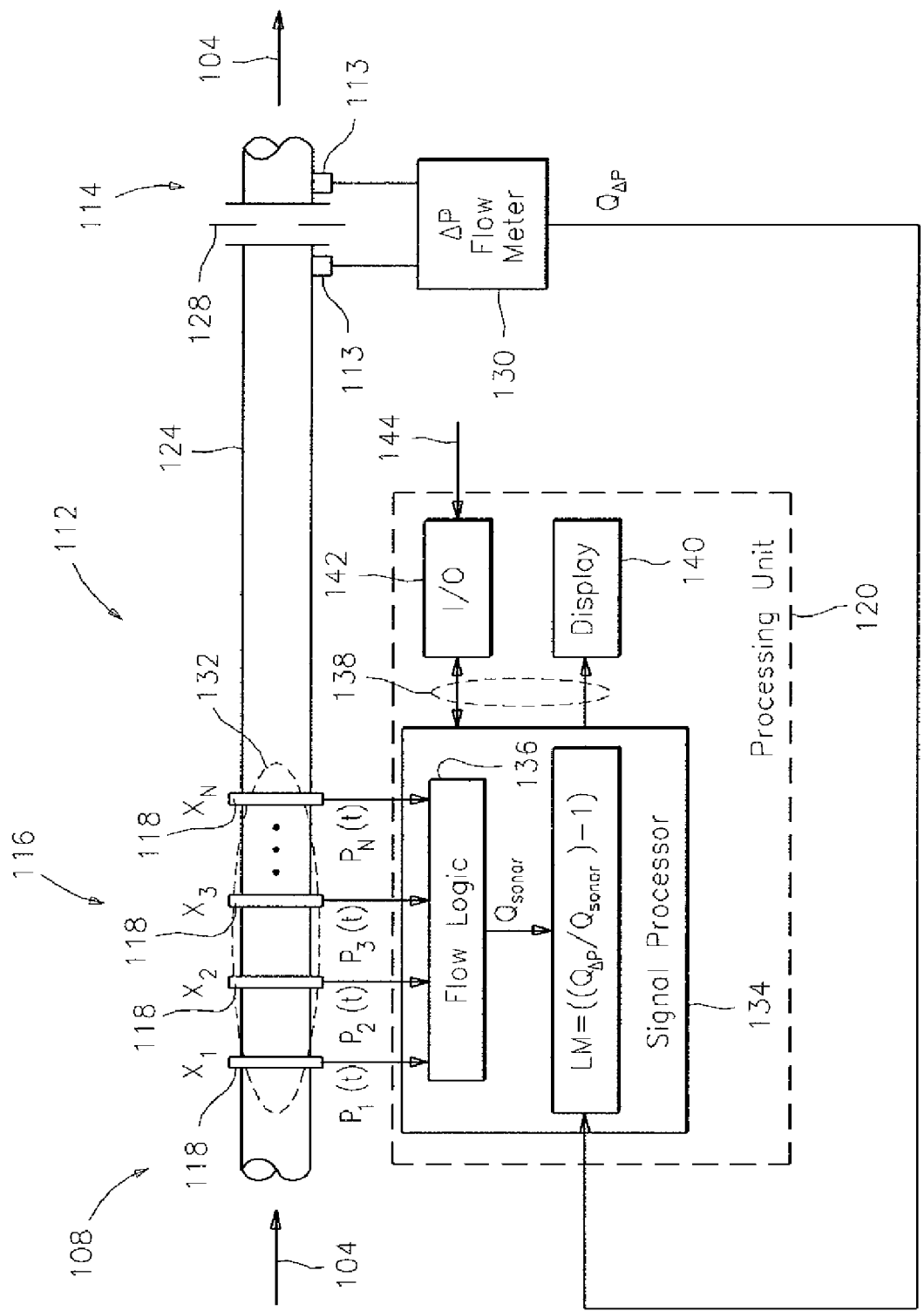
FIG. 1 is schematic diagram of a first embodiment of an apparatus for measuring at least the wetness, the volumetric flow rate of the gas portion, and the volumetric flow rate of the liquid portion of a wet gas flow within a pipe, wherein a flow meter having an array of sensors (sonar meter) is disposed upstream of a differential pressure meter (DP meter) in accordance with the present invention.

Differential pressure-based (DP) flowmeters, such as venturi type flowmeters, are widely used to monitor gas production and are well-known to over-report the gas flow rates in the presence of liquids, wherein this tendency to over report due to wetness indicates a strong correlation with the liquid to gas mass ratio of the flow. As used herein, the term "differential pressure-based flowmeter" or "DP flowmeter" refers to a device that is operable to determine a pressure drop of a flow of fluid, or gas, or mixture thereof, traveling within a pipe across a constriction within that pipe, or through a flow length of pipe. Examples of DP flowmeters that utilize a constriction include, but are not limited to, venturi, orifice, elbow, V-cone, and wedge type flow meters. Additionally, it has been observed that sonar type flowmeters (which do not utilize a constriction within a pipe), as will be described hereinafter, continue to accurately report gas flow rates, independent of the liquid loading. As such, this insensitivity to wetness associated with sonar flow meters provides a practical means for accurately measuring the gas flow rate and the liquid flow rate of a wet gas flow. In the processing of the combined data (i.e. data obtained from the DP flowmeter and the sonar flowmeter) a set of local wetness sensitivity coefficients for each wetness series (at fixed pressure and flow rate) can be used to provide a more accurate characterization for both the DP flowmeter and the sonar flowmeter to determine wetness, wherein the wetness sensitivity coefficients for each device may be provided by a low order polynomial fit of the over-report vs. wetness. This characterization may then be used to "invert" the outputs of the DP flowmeter and the sonar flowmeter to provide an accurate gas flow rate and an accurate liquid flow rate.

It should be appreciated that the wetness insensitivity of a sonar flowmeter deteriorates with decreasing densimetric Froude numbers (Fr), wherein the densimetric Froude number is a measure of the degree of "mixedness" in the flow. As is known, the Froude number is given by, $$Fr \equiv \left(\sqrt{\frac{\rho_{gas}}{\rho_{liq}}}\right) \frac{V_{gas}}{gD} \qquad \text{(Eqn 1)}$$

Wherein Fr is the Froude number, $\rho_{gas}$ is the gas density, $\rho_{liq}$ is the liquid density, $V_{gas}$, is the flow velocity of the gas and gD is the force of gravity multiplied by the inner diameter of the pipe. It should be appreciated that flows that are well mixed provide better results than flows that are not well mixed. As such, because the Froude Number is indicative of the degree to which the mixture is mixed (i.e. the higher the Froude number, the better the flow is mixed), a flow having a Froude Number that is equal to or greater than 2 tends to allow for optimal results. For example, for a Froude number of greater than 2 (i.e. Fr>2), the reported gas rates from the sonar meter is typically within 5% of the actual amount, independent of wetness.

Figure 10:
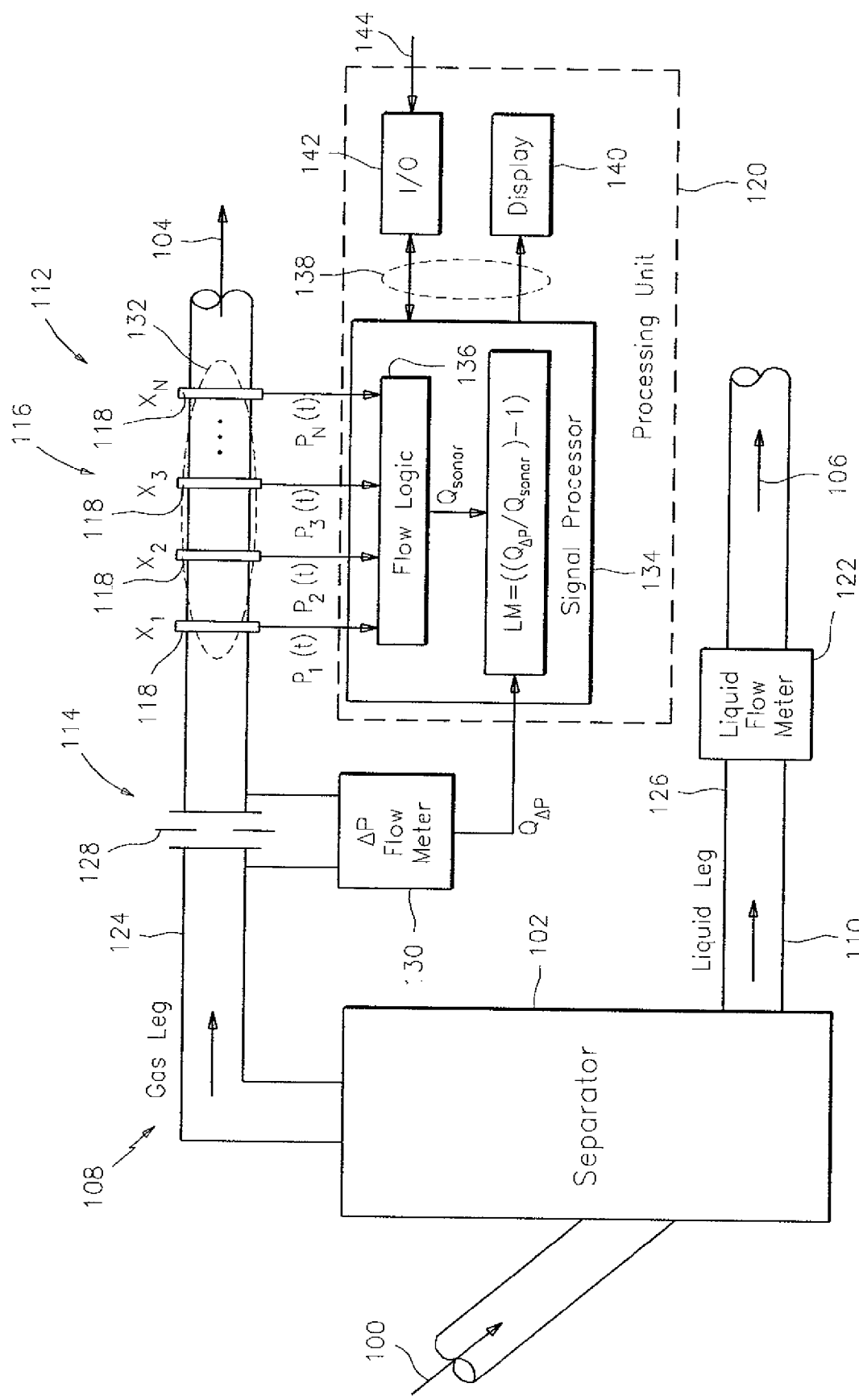
FIG. 10 is schematic diagram of a second embodiment of an apparatus for measuring at least the wetness, the volumetric flow rate of the gas portion, and the volumetric flow rate of the liquid portion of a wet gas flow within a pipe, wherein a flow meter having an array of sensors is disposed upstream of a differential pressure meter in accordance with the present invention.

Referring to FIG. 1, a schematic diagram of a first embodiment of an apparatus 112 for measuring wetness and volumetric flow rates of a wet gas flow 104 flowing within a pipe 124 is shown. The apparatus 112 includes a differential pressure based flowmeter 114 (DP flowmeter) and a flowmeter 116 having an array of sensors 118 (sonar flowmeter). The DP flowmeter 114 determines the volumetric flow rate ($Q_{\Delta P}$) of the wet gas flow 104. Similarly, the sonar flowmeter 116 determines the volumetric flow rate ($Q_{sonar}$) of the wet gas flow 104, which will be described in greater detail herein after. A processing unit 116, in response to volumetric flow rates provided by the DP flowmeter 114 and the sonar flowmeter 116, determines at least the wetness, the volumetric flow rate of the gas portion, and the volumetric flow rate of the liquid portion of a wet gas flow within a pipe, which will be described in greater detail hereinafter. As shown, the sonar flowmeter 116 is disposed downstream of the DP flowmeter 114, which provides a well mixed liquid gas flow 104 to be measured by the sonar flowmeter 116. However, it is contemplated by the present invention that the DP flowmeter may be disposed downstream of the sonar flowmeter as shown in FIG. 10.

The differential pressure based flowmeter 114 may include any type of flowmeter that enables flow measurement using a differential pressure (ΔP) in the flow 104. For example, the DP flowmeter 114 may enable flow measurement by using a flow obstruction 128 or restriction to create a differential of the static pressure of the flow that is proportional to the square of the velocity of the gas flow 104 in the pipe 124, in accordance with Bernoulli's theorem. This type of DP flowmeter typically measures a difference in the static pressure of the flow at two axial positions where the difference in pressure is primarily generated by the flow within the pipe moving through a restriction-type flow obstruction. The differential pressure across the obstruction 128, using a pair of pressure sensors 113, may be measured and converted into a volumetric flow rate using a processor or secondary device 130, such as a differential pressure transmitter. In the example shown, the flow obstruction 128 is an orifice plate 128 through which the wet gas flow 104 passes. The transmitter 130 senses the drop in pressure of the flow 104 across the orifice plate 128, and determines a volumetric flow rate of the wet gas flow 104 ($Q_{\Delta P}$) as a function of the sensed pressure drop. While an orifice-based flow meter 128 is shown, it will be appreciated that the differential pressure based flow meter 14 may include a venturi meter, an elbow flow meter, a v-cone meter, a pipe constriction or the like.

The sonar based flowmeter 116 includes a spatial array 132 of at least two pressure sensors 118 disposed at different axial locations $x_1 \ldots x_N$ along the pipe 124. Each of the pressure sensors 118 provides a pressure signal P(t) indicative of unsteady pressure within the pipe 124 at a corresponding axial location $x_1 \ldots x_N$ of the pipe 124. A signal processor 134 receives the pressure signals $P_1(t) \ldots P_N(t)$ from the pressure sensors 118 in the array 132, and determines the velocity and volumetric flow rate of the wet gas flow 104 using pressure signals from the pressure sensors 118. The signal processor 134 then applies array-processing techniques to the pressure signals $P_1(t) \ldots P_N(t)$ to determine the velocity, volumetric flow rate, and/or other parameters of the wet gas flow 104.

While the sonar based flowmeter 116 is shown as including four pressure sensors 118, it is contemplated that the array 132 of pressure sensors 118 may include two or more pressure sensors 118, each providing a pressure signal P(t) indicative of unsteady pressure within the pipe 124 at a corresponding axial location X of the pipe 124. For example, the sonar based flowmeter 116 may include 2, 3, 4, 5, 6, 7, 8, 9, 10, 11, 12, 13, 14, 15, 16, 17, 18, 19, 20, 21, 22, 23, or 24 pressure sensors 118. Generally, the accuracy of the measurement improves as the number of sensors 118 in the array 132 increases. The degree of accuracy provided by the greater number of sensors 118 is offset by the increase in complexity and time for computing the desired output parameter of the flow. Therefore, the number of sensors 118 used is dependent at least on the degree of accuracy desired and the desired update rate of the output parameter provided by the meter 116.

The signals $P_1(t) \ldots P_N(t)$ provided by the pressure sensors 118 in the array 132 are processed by the signal processor 134, which may be part of the larger processing unit 120. For example, the signal processor 134 may be a microprocessor and the processing unit 120 may be a personal computer or other general purpose computer. It is contemplated that the signal processor 134 may be any one or more analog or digital signal processing devices for executing programmed instructions, such as one or more microprocessors or application specific integrated circuits (ASICS), and may include memory for storing programmed instructions, set points, parameters, and for buffering or otherwise storing data. Further, it should be appreciated that some or all of the functions within the flow logic 136 may be implemented in software (using a microprocessor or computer) and/or firmware, or may be implemented using analog and/or digital hardware, having sufficient memory, interfaces, and capacity to perform the functions described herein.

To determine the volumetric flow rate $Q_{sonar}$ of the wet gas flow 104, the signal processor 134 applies the data from the pressure sensors 118 to flow logic 136 which is executed by the signal processor 134. The flow logic 136 is described in further detail hereinafter. It is also contemplated that one or more of the functions performed by the secondary device 130 of the differential pressure flowmeter 114 may be performed by the signal processor 134. For example, signals indicative of gas flow pressure upstream and downstream of the orifice 128 may be provided to the signal processor 134, and the signal processor 134 may determine the volumetric flow rate $Q_{\Delta P}$. Using the volumetric flow rate of the wet gas flow 104 determined by the differential pressure based flowmeter 114 ($Q_{\Delta P}$) and the volumetric flow rate of the gas flow 104 determined by the sonar based flowmeter 116 ($Q_{sonar}$) the signal processor 134 can determine the wetness, the volumetric flow rate of the gas portion, and the volumetric flow rate a the liquid portion of the flow 104.

Figure 5:
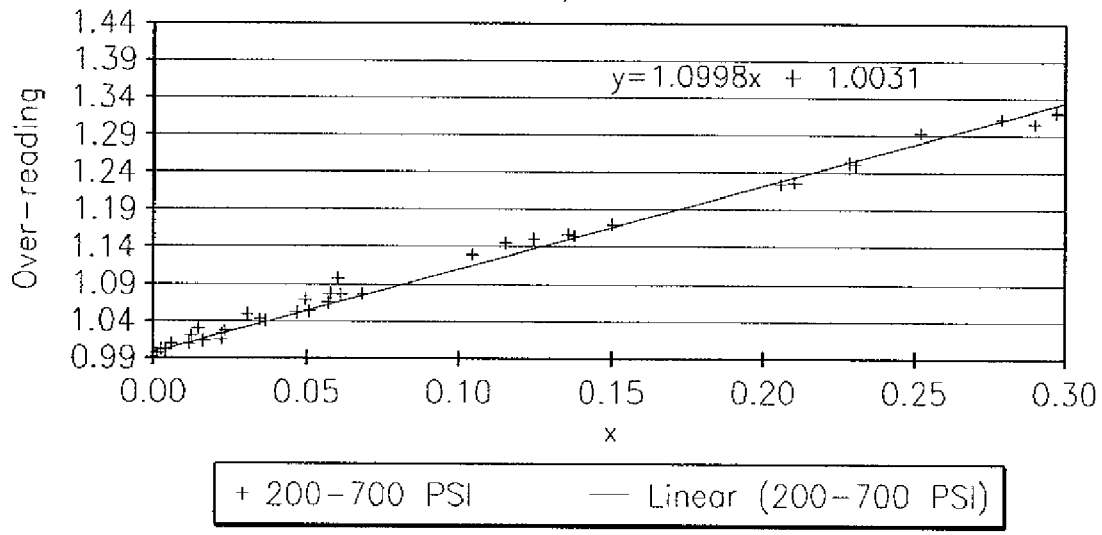
FIG. 5 is a plot of over reporting (over-reading) of an Emerson Model 1595 orifice based flow meter as a function of Lockhart-Martinelli number.

One measure of the wetness of the wet gas flow 104 or a gas continuous mixture is the Lockhardt Martinelli (LM) number. The LM number is defined as the square root of the ratio of the product of liquid mass flow times the liquid volumetric flow to the product of the gas mass flow times the gas volumetric flow and is given by, $$LM \equiv \sqrt{\frac{\dot{m}_{liq} Q_{liq}}{\dot{m}_{gas} Q_{gas}}} \equiv \sqrt{\frac{\rho_{liq} Q_{liq}^2}{\rho_{gas} Q_{gas}^2}} \equiv \left(\frac{\sqrt{\rho_{liq}}}{\sqrt{\rho_{gas}}}\right)\left(\frac{Q_{liq}}{Q_{gas}}\right) \qquad \text{(Eqn 2)}$$

wherein $m_{liq}$ is the liquid mass flow, $Q_{liq}$ is the liquid volumetric flow, $\rho_{liq}$ is the density of the liquid, $\dot{m}_{gas}$ is the gas mass flow, $Q_{gas}$ is the gas volumetric flow, and $\rho_{gas}$ is the density of the gas. The differential pressure based flowmeter 114 will over report the volumetric flow rate of the gas flow 104 by a ratio of 1+αLM as compared to the volumetric flow reported for an equivalent volume flow rate of dry gas. FIG. 5 depicts a plot of this over reporting (over-reading) of an Emerson Model 1595 orifice based flow meter as a function of the LM number and as shown, the over reporting scales linearly with the LM number.

Figure 6:
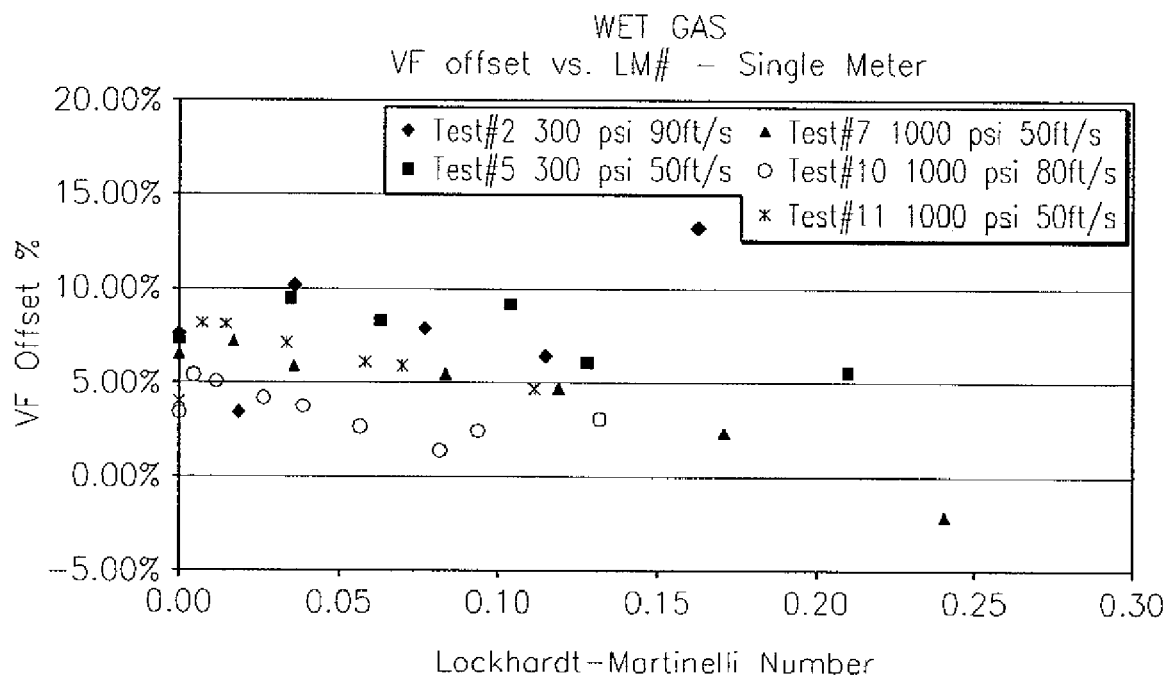
FIG. 6 is a plot depicting the offset between a sonar flow meter and a reference volumetric flow rate as a function of Lockhart-Martinelli number.

In contrast, the sonar based volumetric flowmeter 116 has been demonstrated to accurately report a volumetric flow of a wet gas mixture with little sensitivity to wetness. FIG. 6 depicts the offset between a sonar flowmeter 116 and a reference volumetric flow rate as a function of the LM number. As shown, the offset is a relatively weak function of the LM number. Accordingly:

$$Q_{SONAR} = Q_{gas} \qquad \text{(Eqn 3)}$$

wherein $Q_{SONAR}$ is the flow rate of the gas of the flow 104.

The sonar flowmeter 116 and the differential flowmeter ("DP meter") 114 will report the same flow rates for dry gases, and will report diverging flow rates with increasing wetness. Thus, the combination of the volumetric flow rates $Q_{\Delta P}$ and $Q_{sonar}$ from the differential pressure based flowmeter 114 and sonar based flowmeter 116 provide a measure of both the flow rate and the wetness of a gas continuous flow 104, which can be determined by the signal processor 134 using the equations:

$$Q_{\Delta P} = Q_{gas}(1 + \alpha LM) \qquad \text{(Eqn 4a)}$$

or $$LM = \frac{1}{\alpha}\left(\frac{Q_{\Delta P}}{Q_{SONAR}} - 1\right) \quad \text{(Eqn 4b)}$$

where α is an empirically determined wetness sensitivity coefficient that may be introduced by various factors, such as environmental factors (i.e. temperature and/or pressure) and/or factors related to the meter being used (i.e. a characteristic of an individual or group of meters and/or the tolerance of the meter). It should be appreciated that a calibration point can be added by equating the outputs of the differential pressure based flowmeter 114 and sonar based flowmeter 116 during flow conditions where the gas is known to be dry.

As one can appreciate the LM number may be determined using the measured volumetric flow rates (i.e., $Q_{\Delta P}$ and $Q_{SONAR}$) measured by the DP flowmeter 114 and the sonar flowmeter 116, respectively, using Eqn. 4b. Knowing the LM number and the density of the gas and liquid, the volumetric flow rate of the liquid may be determined using Eqn. 2 and Eqn. 3.

While the over-reporting may be defined as the linear function 1+αLM, one will appreciate that the invention contemplates that the over-reporting can be defined as any function suitable to the desired end purpose, such as a linear, quadratic, polynomial and/or logarithmic function that defines an over-reporting characteristics of the meters which will be described in greater detail hereinafter. In other words, any over-reporting function may be used that accurately fits the output of the flowmeters 114, 116 over the desired range of LM numbers (e.g., curve fitting).

The signal processor 134 may output the LM number, the volumetric flow rates $Q_{\Delta P}$ and/or $Q_{sonar}$, velocity of the gas and liquid portions, or any combination thereof, as well as various other parameters that may be determined from these values as a signal 138. The signal 138 may be provided to a display 140, another input/output (I/O) device 142 or another processing device for further processing. Moreover, the I/O device 142 may also accept user input parameters 144 as may be necessary for the flow logic 136. The I/O device 142, display 140, and/or signal processor 134 unit may be mounted in a common housing, which may be attached to the array 132 by a flexible cable, wireless connection, or the like. The flexible cable may also be used to provide operating power from the processing unit 120 to the array 132 if necessary.

Figure 2:
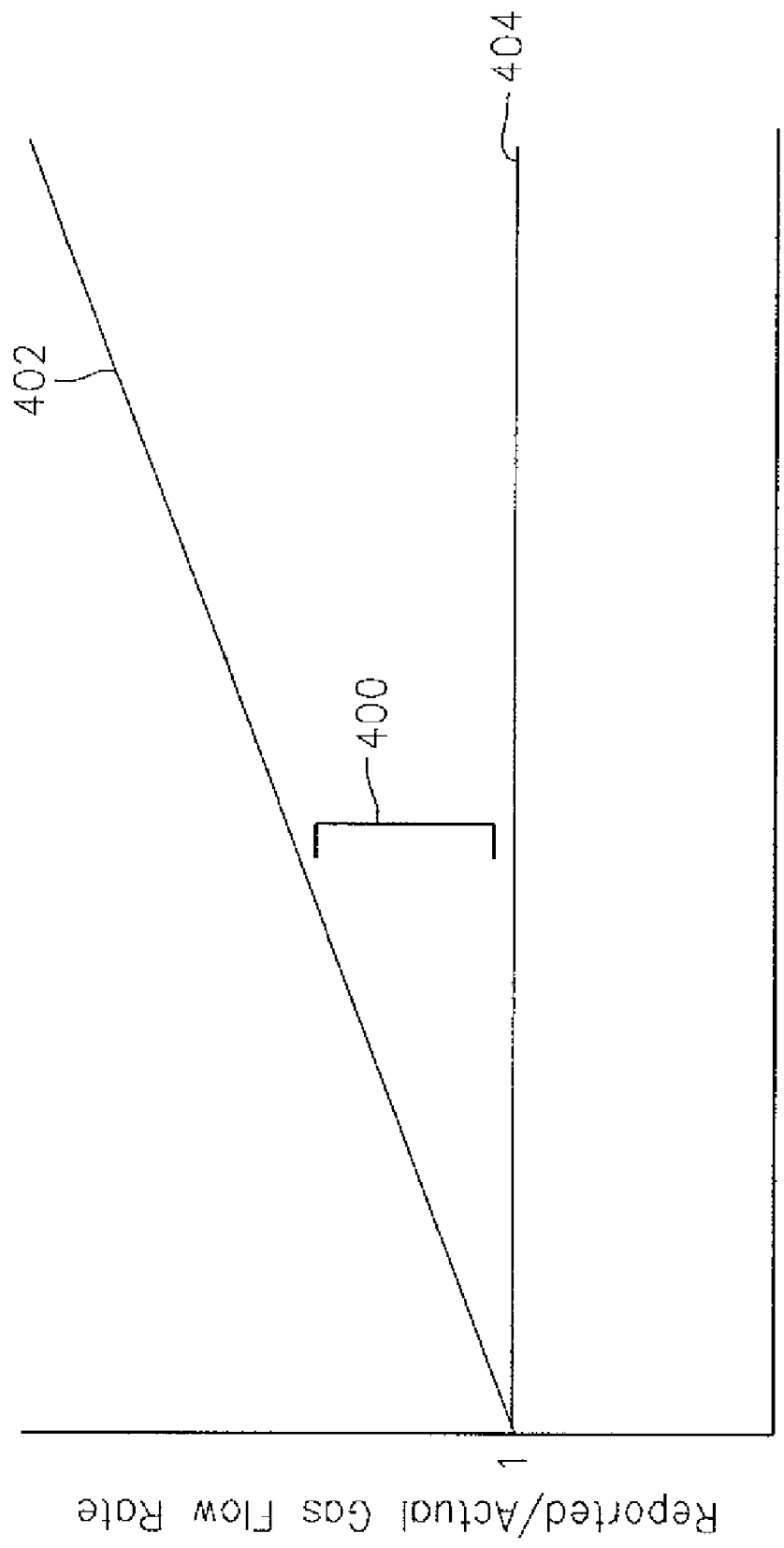
FIG. 2 is a plot of the output of a DP meter and an output of a sonar meter to illustrate that the wetness of the gas is related to the difference of the two outputs in accordance with the present invention.

It should be appreciated that the relationship of the LM number to the output of the DP flowmeter 114 ($Q_{\Delta P}$) and the sonar flowmeter 116 ($Q_{SONAR}$) as described hereinbefore is graphically illustrated in FIG. 2. As shown, the difference 400 between the volumetric flow rate 402 of the DP flowmeter 114 and the volumetric flow rate 404 of the sonar flowmeter 116 is related to the wetness of the gas flow 104, and is given by 1+αLM. While the description for the sonar flowmeter 116 provides an output signal representative of the velocity or flow rate of the gas to be used in the determination of the wetness, the invention contemplates that any other output of the sonar meter 116, which is insensitive to wetness, may be used to determine the wetness of the gas.

Figure 3:
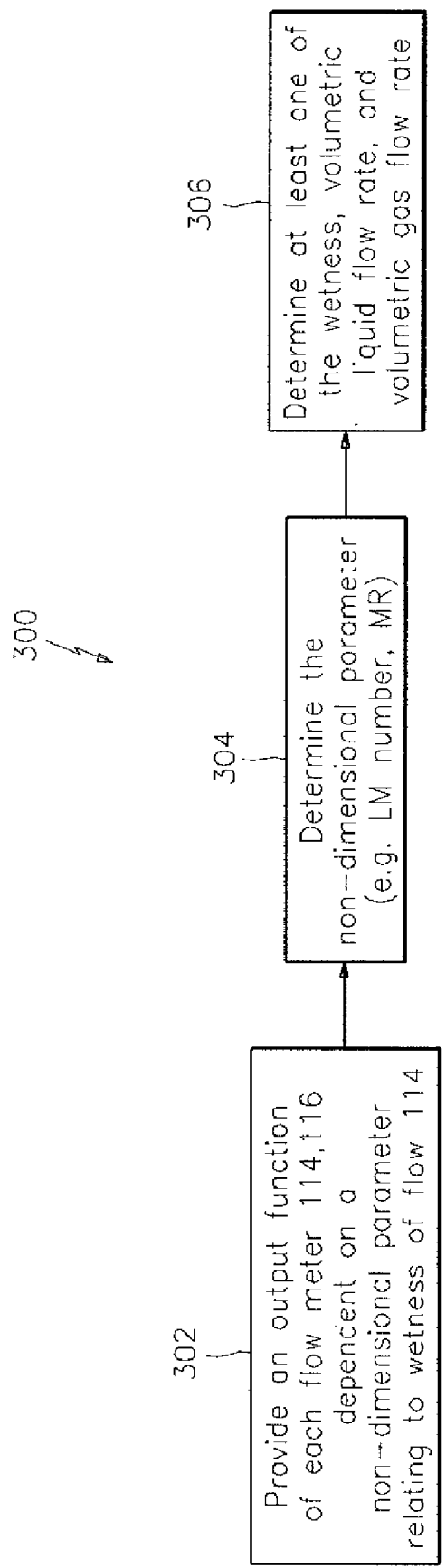
FIG. 3 is a block diagram illustrating one embodiment of a wet gas algorithm in accordance with the present invention.

Referring to FIG. 3, a block diagram 300 describes an example of an algorithm for determining at least one of the wetness, volumetric liquid flow rate, and volumetric gas flow rate of the wet gas 104 flowing in the pipe 124. An output function of each of the flowmeters 114, 116 is provided that is dependent on a non-dimensional parameter relating to the wetness of the flow 104, as shown in operational block 302.

The non-dimensional parameter (e.g., LM number and liquid to gas mass flow ratio (MR or LGMR)) is determined, as shown in operational block 304. Knowing the non-dimensional parameter, the gas and liquid volumetric flow rates ($Q_{\Delta P}$, $Q_{SONAR}$) are determined, as shown in operational block 306. This may be accomplished by utilizing the relationship between the volumetric flow rate or velocity of the flow 104 obtained by the sonar flowmeter 116, and the volumetric flow rate or velocity of the flow obtained by the DP flowmeter 114 (e.g., venturi meter), wherein the volumetric flow rate of the wet gas flow 104 obtained by the sonar flowmeter 116, $Q_{SONAR}$, can be expressed as, $$Q_{SONAR} = (1+\alpha MR)Q_{gas}, \quad \text{(Eqn 5)}$$

and the volumetric flow rate of the flow obtained by the DP flowmeter, $V_{venturi}$ can be expressed as, $$Q_{venturi} = (1+\beta MR+\chi MR^2)Q_{gas}, \quad \text{(Eqn 6)}$$

where α, β and χ are empirically determined wetness sensitivity coefficients, MR is the liquid to gas mass flow ratio and $Q_{gas}$ is the volumetric flow rate of the gas portion of the wet gas flow 104. While the over-reporting of the sonar meter may be defined as 1+αMR and the over-reporting of the DP meter (e.g., venturi meter) may be defined as 1+βMR+χMR², one will appreciate that the invention contemplates that the over-reporting can be defined as any function suitable to the desired end purpose, such as a linear, quadratic, polynomial and/or logarithmic function that defines an over-reporting characteristics of the meters which will be described in greater detail hereinafter.

Moreover, while $Q_{SONAR}$ is shown as being defined by the function in Eqn. 5 and $Q_{Venturi}$ is shown as being defined by the function in Eqn. 6, it should be appreciated that $Q_{SONAR}$ and $Q_{venturi}$ may be defined by any function suitable to the desired end purpose, such as a linear, quadratic, polynomial and/or logarithmic function that defines an over-reporting characteristic of the meter(s) as will be described in greater detail hereinafter. In other words, any over-reporting function may be used that accurately fits the output of the flowmeters 114, 116 over the desired range of MRs (e.g., curve fitting).

The value for MR may be determined by solving the above equations (Eqn. 5 and Eqn. 6) for $Q_{gas}$ and equating the two resultant equations as follows, $$Q_{gas} = \frac{Q_{SONAR}}{(1+\alpha MR)}, \quad \text{(Eqn 7)}$$

and $$Q_{gas} = \frac{Q_{venturi}}{(1+\beta MR+\chi MR^2)}. \quad \text{(Eqn 8)}$$

Thus, it follows that, $$\frac{Q_{SONAR}}{(1+\alpha MR)} = \frac{Q_{venturi}}{(1+\beta MR+\chi MR^2)}, \quad \text{(Eqn 9)}$$

and, therefore,

-continued $$MR = \frac{-\left(\beta - \alpha\frac{Q_{venturi}}{Q_{sonar}}\right) + \sqrt{\left(\beta - \alpha\frac{Q_{venturi}}{Q_{sonar}}\right)^2 - 4\chi\left(1 - \frac{Q_{venturi}}{Q_{sonar}}\right)}}{2\chi}.$$ (Eqn 10)

At this point, the gas flow rate, $Q_{gas}$, and the liquid flow rate, $Q_{Liq}$, can be determined by using the following relationships, $$Q_{gas} = \frac{Q_{SONAR}}{(1 + \alpha MR)},$$ (Eqn 11)

and $$Q_{liq} = \left(\frac{\rho_{gas}}{\rho_{liq}} MR\right) Q_{gas},$$ (Eqn 12)

where $\rho_{gas}$ is the density of the gas flow and $\rho_{liq}$ is the density of the liquid flow.

Figure 4:
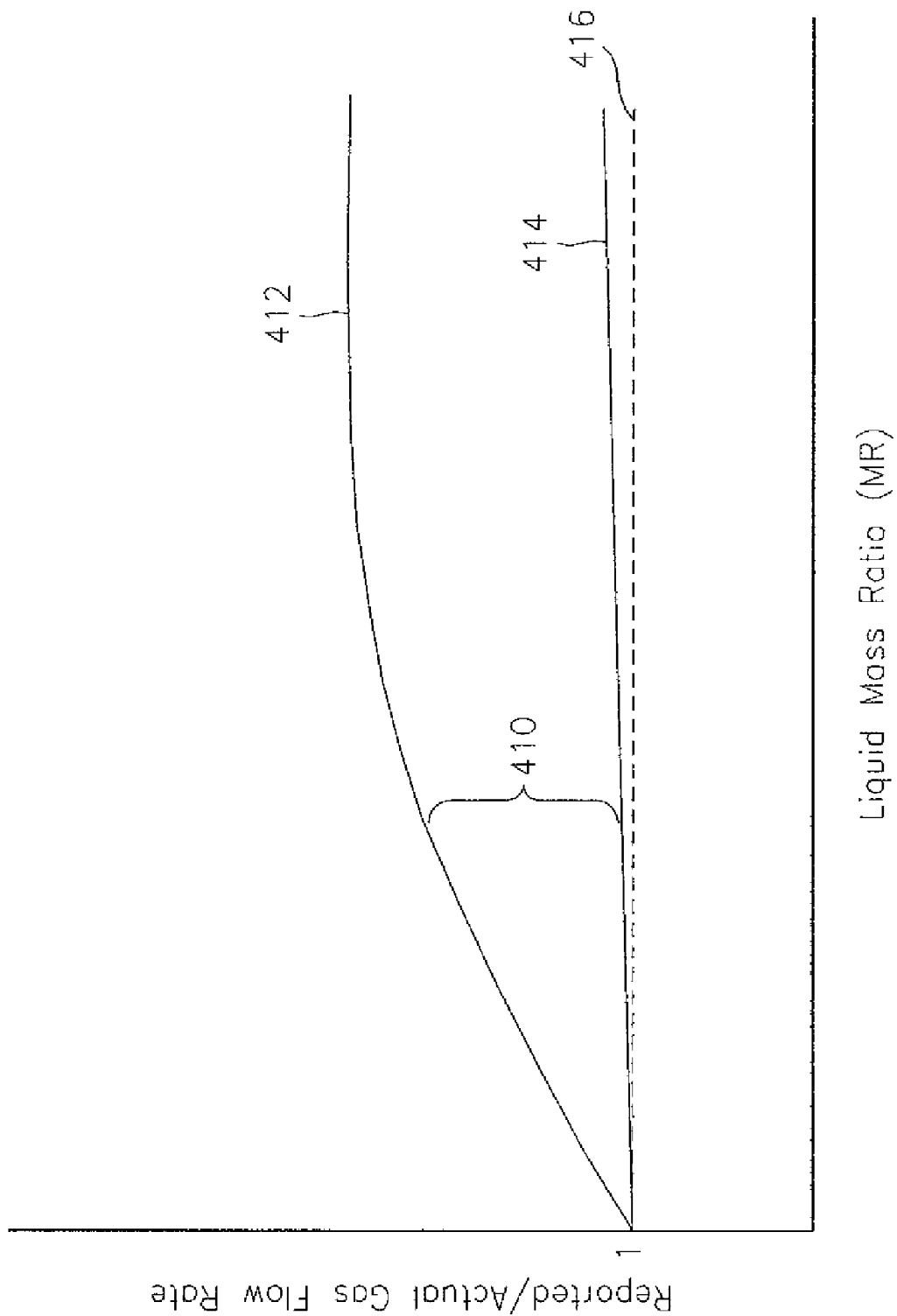
FIG. 4 is a plot of the output of a DP meter and an output of a sonar meter to illustrate that the wetness of the gas is related to the difference of the two outputs in accordance with the present invention.

It should be appreciated that the relationship of the MR to the output of the DP flowmeter 114 ($Q_{\Delta P}$) and the sonar flowmeter 116 ($Q_{SONAR}$) as described hereinbefore is graphically illustrated in FIG. 4. As shown, the difference 410 between the volumetric flow rate 412 of the DP flowmeter 114 and the volumetric flow rate 414 of the sonar flowmeter 116 is relative to the wetness of the gas flow 104, and is given by the difference of $1+\beta MR+\chi MR^2$ and $1+\alpha MR$. While the description for the sonar flowmeter 116 provides an output signal representative of the velocity or volumetric flow rate of the gas to be used in the determination of the wetness, the invention contemplates that any other output of the sonar flowmeter 116, which is insensitive to wetness may be used to determine the wetness of the gas. Additionally, while the DP flowmeter 114 is described herein as being a venturi meter, the invention contemplates that any other type of DP flowmeter suitable to the desired end purpose may be used.

One will also appreciate that while the characteristics of the output was defined as the volumetric flow rates of the meters, the present invention contemplates that the characteristics may be defined by any other output measured by the flow meters, such as the flow velocity, provided the sensitivity of the outputs to wetness are comparable to the sensitivity of the measured volumetric flow rate. In other words, the measured parameter of the DP flowmeter 114 is sensitive to wetness and the measured output of the sonar flowmeter 116 is relatively insensitive to wetness of the flow 104.

Furthermore, while the present invention defines the outputs of the DP flowmeter 114 and the sonar flowmeter 116 as a respective formula to be solved, it will be appreciated that the data may be provided in the form of a look-up table to provide a number for a non-dimensional parameter (e.g., LM number, MR), the volumetric liquid flow rate and volumetric gas flow rate of the flow 104 in response to the measured parameters (velocity, volumetric flow) of the flowmeters 114, 116.

Referring to FIG. 10, the apparatus 112 is shown wherein the wet gas mixture 104 is directed to flow in a gas leg portion 108 of a separator 102 and the liquid 106 is directed to flow in a liquid leg portion 110 of the separator 102. The gas mixture 104 flowing in the gas leg 108 includes gas and liquid carry-over from the separator 102. The fluid flow 100 is shown being introduced into a separator 102 which separates the fluid flow 100 into a gas mixture 104 and a liquid 106, wherein the gas mixture 104 is directed to flow in a gas leg portion 108 of the separator 102 and the liquid 106 is directed to flow in a liquid leg portion 110 of the separator 102. The gas mixture 104 flowing in the gas leg 108 includes gas and liquid carry-over from the separator 102. An apparatus 112 is provided to measure the wetness and flow rate of the gas mixture 104 and may include a differential pressure flowmeter ("DP flowmeter") 114 and a sonar flowmeter 116 having an array of strain-based sensors 118, wherein the combination of the DP flowmeter 114 and the sonar flowmeter 116 provides flow rate measurements to a separator outflow processor 120. As described in greater detail hereinbefore, using the measurements from the DP flowmeter 114 and the sonar flowmeter 116, the separator outflow processor 120 determines the wetness of the gas mixture 104 in the gas leg 108 as well as, the volumetric flow rate of the gas, and the volumetric flow rate of the liquid carry-over. The volumetric flow rate of the components of the liquid carry-over (i.e. oil and water) may be determined by assuming a known or typical water cut (or phase fraction) or by using the water cut measured as may be provided by a liquid flowmeter 122 disposed on the liquid leg portion 110 of the separator 102.

The gas/liquid separator 102 is an item of production equipment used to separate liquid components of an incoming fluid stream 100 from any gaseous components. The liquid and gas components flow from the separator 102 in separate pipes (legs) 124 and 126; leg 124 contains the gas component 104 and leg 126 contains the liquid component 106. The liquid leg 126 may include the liquid flowmeter 122, which measures the volumetric flow rate of the liquid 106 flowing there through. While the separator 102 is depicted as a vertical vessel, the gas/liquid separator 102 may be any device for separating gas from one or more liquids. For example, the separator 102 may include a cylindrical or spherical vessel, and may be either horizontally or vertically positioned. Furthermore, the separator 102 may use gravity segregation, centrifugal separation, cyclone separation, or any other known means to accomplish the separation, and may include one or more stages.

It should be appreciated that the sonar flowmeter 116 may comprise a plurality of ultrasonic sensors 118 to provide an output signal, for example a velocity measurement. The ultrasonic sonar flowmeter 116 is similar to that described in U.S. patent application Ser. No. 10/756,977 filed on Jan. 13, 2004 and U.S. Pat. No. 7,237,440, which are incorporated herein by reference.

It should be further appreciated that the sensors 118 may also include electrical strain gages, optical fibers and/or gratings, ported sensors, among others as described herein, and may be attached to the pipe 124 by adhesive, glue, epoxy, tape or other suitable attachment means to ensure suitable contact between the sensor and the pipe 124. Additionally, the sensors 118 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 124. If desired, for certain applications, gratings may be detached from (or strain or acoustically isolated from) the pipe 124 if desired. It is also contemplated that any other strain sensing technique may be used to measure the variations in strain in the pipe 124, such as highly sensitive piezoelectric, electronic or electric, strain gages attached to or embedded in the pipe 124.

In various embodiments of the present invention, a piezoelectronic pressure transducer may be used as one or more of the pressure sensors 118 and it may measure the unsteady (or dynamic or ac) pressure variations inside the pipe 124 by measuring the pressure levels inside the pipe 124. In one embodiment of the present invention, the sensors 118 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output.

Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The Model 106B has a 300 mV/psi sensitivity and a resolution of 91 dB (0.0001 psi). The sensors 118 may incorporate a built-in MOSFET microelectronic amplifier to convert the high-impedance charge output into a low-impedance voltage signal. The sensors 118 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves. The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 118 may include a piezoelectric sensor that provides a piezoelectric material to measure the unsteady pressures of the flow 104. The piezoelectric material, such as the polymer, polarized fluoropolymer, PVDF, measures the strain induced within the process pipe 124 due to unsteady pressure variations within the flow 104. Strain within the pipe 124 is transduced to an output voltage or current by the attached piezoelectric sensors 118.

The PVDF material forming each piezoelectric sensor 118 may be adhered to the outer surface of a steel strap that extends around and clamps onto the outer surface of the pipe 124. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique include the following:

1. Non-intrusive flow rate measurements;
2. Low cost;
3. Measurement technique requires no excitation source. Ambient flow noise is used as a source;
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals; and 5. Higher Temperatures (140 C)(co-polymers).

Flow Logic

As described in commonly-owned U.S. Pat. No. 6,609,069 to Gysling, entitled "Method and Apparatus for Determining the Flow Velocity Within a Pipe", which is incorporated herein by reference in its entirety, the unsteady pressures along a pipe 124 caused by coherent structures (e.g., turbulent eddies and vortical disturbances) that convect with a fluid (e.g., gas flow 104) flowing in the pipe 124, contain useful information regarding parameters of the fluid.

Figure 7:
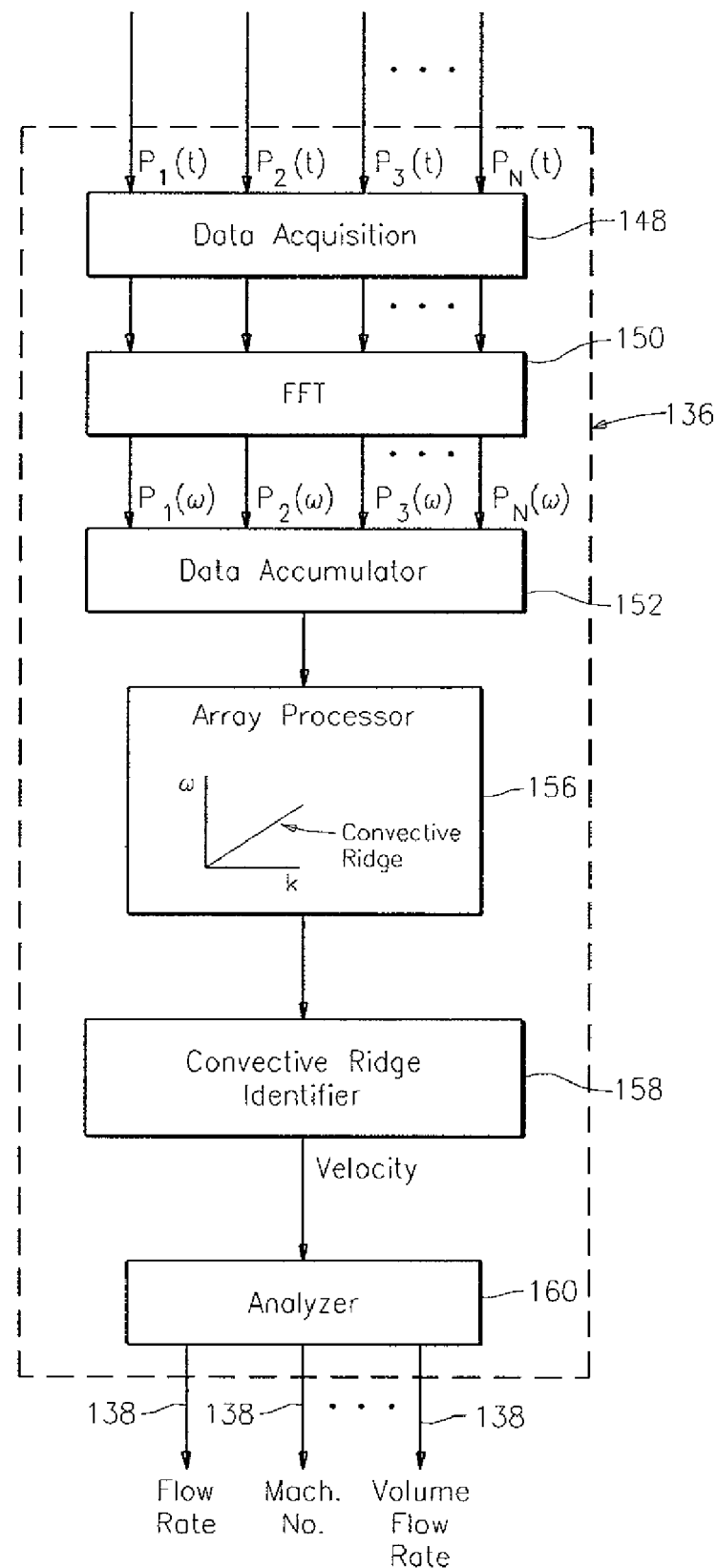
FIG. 7 is a block diagram of a first embodiment of a flow logic embodiment for the sonar flow meter in the apparatus of FIG. 1.
Figure 8:
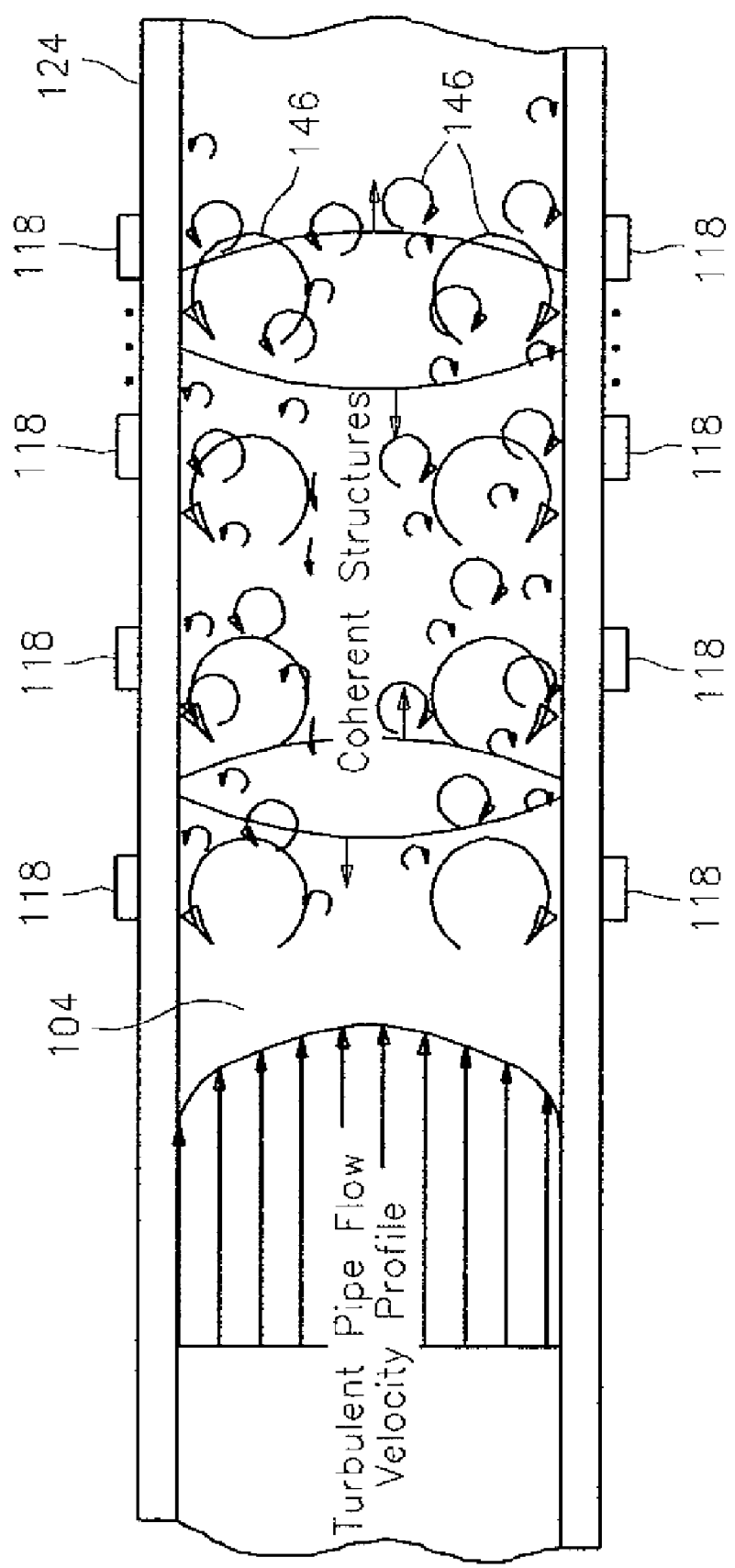
FIG. 8 is a cross-sectional view of a pipe having coherent structures therein.

Referring to FIG. 7, an example of the flow logic 136 is shown. As previously described, the array 132 of at least two sensors 118 located at two locations $x_1$, $x_2$ axially along the pipe 124 sense respective stochastic signals propagating between the sensors 118 within the pipe 124 at their respective locations. Each sensor 118 provides a signal indicating an unsteady pressure at the location of each sensor 118, at each instant in a series of sampling instants. One will appreciate that the array 132 may include more than two sensors 118 distributed at locations $x_1 \ldots x_N$. The pressure generated by the convective pressure disturbances (e.g., eddies 146, see FIG. 8) may be measured through the sensors 118, which may be strained-based sensors and/or pressure sensors. The sensors 118 provide analog pressure time-varying signals $P_1(t)$, $P_2(t), P_3(t) \ldots P_N(t)$ to the signal processor 134, which in turn applies these signals $P_1(t)$, $P_2(t)$, $P_3(t) \ldots P_N(t)$ to the flow logic 136. The flow logic 136 processes the signals $P_1(t)$, $P_2(t)$, $P_3(t) \ldots P_N(t)$ to first provide output signals (parameters) indicative of the pressure disturbances that convect with the fluid (gas) 104, and subsequently, provide output signals in response to pressure disturbances generated by convective waves propagating through the fluid 104, such as velocity, Mach number and volumetric flow rate of the fluid 104.

The signal processor 134 includes data acquisition unit 148 (e.g., A/D converter) that converts the analog signals $P_1(t) \ldots P_N(t)$ to respective digital signals and provides the digital signals $P_1(t) \ldots P_N(t)$ to FFT logic 150. The FFT logic 150 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals to a data accumulator 152. Instead of FFTs, any other technique for obtaining the frequency domain characteristics of the signals $P_1(t)$-$P_N(t)$, may also be used. For example, the cross-spectral density and the power spectral density may be used to form one or more frequency domain transfer functions (or frequency responses or ratios) discussed hereinafter. One technique of determining the convection velocity of the turbulent eddies 146 within the fluid 104 is by characterizing a convective ridge (154 in FIG. 9) of the resulting unsteady pressures using an array of sensors or other beam forming techniques, similar to that described in U.S. Pat. No. 6,889,562 and U.S. Pat. No. 6,609,069, which are incorporated herein by reference.

Figure 9:
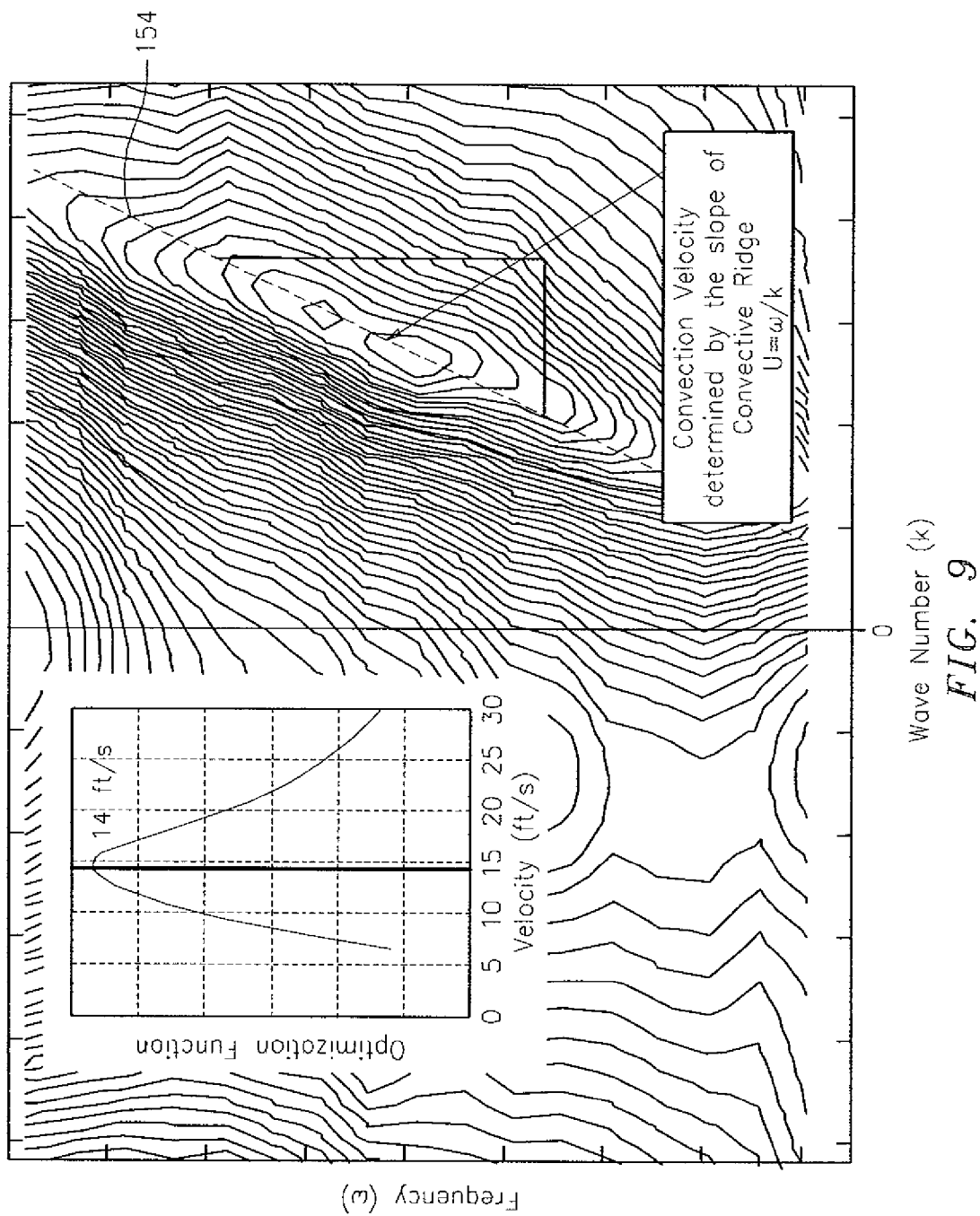
FIG. 9 is a kω plot of data processed from the apparatus of the present invention that illustrates the slope of the convective ridge, and a plot of the optimization function of the convective ridge in accordance with the present invention.

The data accumulator 152 accumulates the frequency signals $P_1(\omega)$-$P_N(\omega)$ over a sampling interval, and provides the data to an array processor 156, which performs a spatial-temporal (two-dimensional) transform of the sensor data, from the xt domain to the k-ω domain, and then calculates the power in the k-ω plane, as represented by the k-ω plot shown in FIG. 9. The array processor 156 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

It should be appreciated that the prior art teaches many algorithms for use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length. Convective characteristics or parameters have a dispersion relationship that can be approximated by the straight-line equation, $$k=\omega/u, \quad \text{(Eqn 13)}$$

where u is the convection velocity (flow velocity). A plot of k-ω pairs is obtained from a spectral analysis of sensor samples associated with convective parameters. The pairings are portrayed so that the energy of the disturbance spectrally corresponding to the pairings can be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 146 are distributed over a range of length scales and hence temporal frequencies.

To calculate the power in the k-ω plane, as represented by a k-ω plot (see FIG. 9) of either one of the signals, the array processor 156 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 118. The present invention may use temporal and spatial filtering to precondition the signals to effectively filter out the common mode characteristics $P_{common\ mode}$ and other long wavelength (compared to the sensor spacing) characteristics in the pipe 124 by differencing adjacent sensors 118 and retaining substantial portion of the stochastic parameter associated with the flow field and any other short wavelength (compared to the sensor spacing) low frequency stochastic parameters. In the case of suitable turbulent eddies 146 (see FIG. 8) being present, the power in the k-ω plane shown in the k-ω plot of FIG. 9 shows a convective ridge 154. The convective ridge 154 represents the concentration of a stochastic parameter that convects with the flow and is a mathematical manifestation of the relationship between the spatial variations and temporal variations described above. Such a plot will indicate a tendency for k-ω pairs to appear more or less along a line 154 with some slope, the slope indicating the flow velocity.

Once the power in the k-ω plane is determined, a convective ridge identifier 158 uses one or another feature extraction method to determine the location and orientation (slope) of any convective ridge 154 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 158 provides information about the different trial convection velocities, information referred to generally as convective ridge information to an analyzer 160. The analyzer 160 then examines the convective ridge information including the convective ridge orientation (slope). Assuming the straight-line dispersion relation given by $k=\omega/u$, the analyzer 160 determines the flow velocity, Mach number and/or volumetric flow, which are output as signals 138. The volumetric flow is determined by multiplying the cross-sectional area of the inside of the pipe 124 with the velocity of the process flow.

The present invention contemplates that the sonar flow meter 116 may be substituted with an ultrasonic flow meter similar to any one of the following types of meters: Transit Time Ultrasonic Flow Meter (TTUF), Doppler Ultrasonic Flowmeter (DUF), and Cross Correlation Ultrasonic Flow Meter (CCUF), similar to that described in the article "Guidelines for the Use of Ultrasonic Non-Invasive Metering Techniques" by M. L. Sanderson and H. Yeung, published on Jul. 17, 2002, which incorporated herein by reference. One such CCUF is manufactured by GE Panametrics DigitalFlow™ CTF878 flowmeter having a pair of ultrasonic sensors disposed axially along the pipe, which is incorporated herein by reference.

It should be appreciated that while the invention is discussed herein with reference to the Lockbardt-Martinelli Number and/or Liquid to Gas Mass Ratio, other non-dimensional parameters related to wetness may also be used; e.g., the Fanning function factor. The present invention is also not limited to using non-dimensional parameters related to wetness. It should also be appreciated that the method of the present invention provides for a flow measurement that is very insensitive to wetness, such as that provided by the sonar flowmeter 116. As such, the present invention allows for a greater difference in the over reporting between the sonar flowmeter 116 and the DP flowmeter 114 which translates into measurements that have a greater accuracy and resolution than existing methods.

While the invention disclosed herein is discussed in terms of a DP flowmeter(s), a sonar flowmeter and/or an ultrasonic flowmeter, the present invention contemplates that any meter and/or combination of meters suitable to the desired end purpose may be used, such that the meters provide an output measurement having a repeatable over report function (or output signal) with respect to the wetness of the flow 104, wherein the over reporting is substantially less than the over reporting of the DP flowmeter 114. The greater the difference in the over reporting between the flowmeter 116 and the DP flowmeter 114, the greater the accuracy and resolution of the wetness measurement. Moreover, one should appreciate that the meters (e.g., sonar meter and ultrasonic meter) combined with the differential meter may also comprise non-invasive clamp-on sensors or wetted sensors. It should be further understood that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the spirit and scope of the present invention.

Additionally, it should be appreciated that although in the example shown the pipe 124 is depicted as the gas leg 108 of the gas/liquid separator 102, it is contemplated that the apparatus 112 may be used on any duct, conduit or other form of pipe 124 through which a gas 104 may flow.

Figure 11:
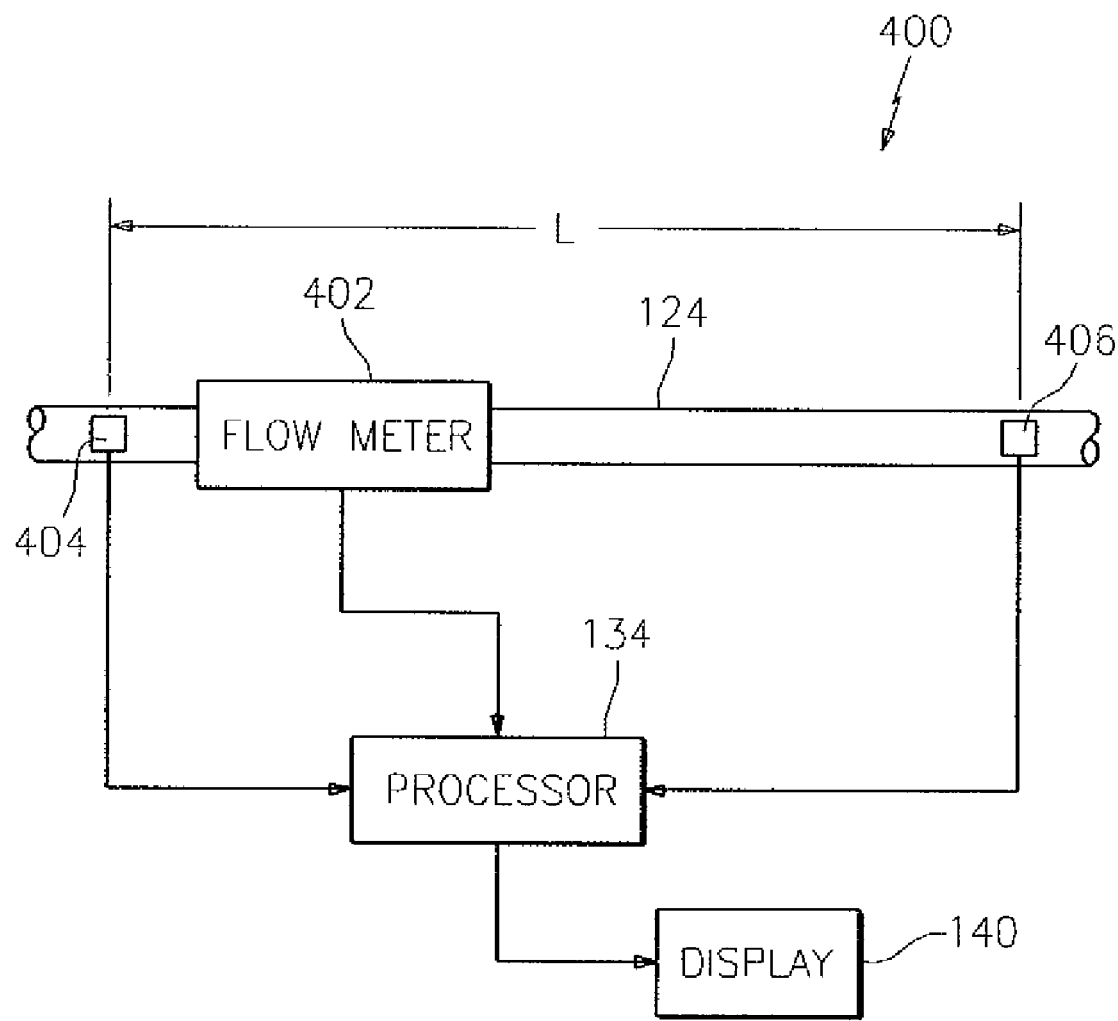
FIG. 11 is schematic diagram of another embodiment of an apparatus, wherein a flow meter having an array of sensors (sonar flowmeter) is disposed on a pipe proximate to a pair of sensors that measure the differential pressure between two locations on a pipe (DP flowmeter) in accordance with the present invention.

Referring to FIG. 11, a schematic diagram is provided illustrating another embodiment of the present invention provided hereinbefore. The wet/gas measuring apparatus 400 includes a flowmeter 402 that is relatively insensitive to wetness of a wet gas flow (e.g., a sonar type flowmeter 116 as described herein earlier), and a pair of pressure sensors 404, 406 disposed on the pipe that together form at least part a flowmeter that is relatively sensitive to the wetness of a wet gas flow. Each pressure sensor 404, 406 measures the static pressure of the flow at a particular location. The specific type of pressure sensor 404, 406 will depend upon the particular application, and will likely take into account flow operating conditions such as temperature, pressure, etc. The pressure sensors 404, 406 are sufficiently spaced apart from one another on the pipe such that wet gas flow traveling between the sensors 404, 406 will experience a pressure drop. The limits of the separation distance between the pressure sensors 404, 406 will depend upon factors such as the application, the resolution of the pressure sensors, and the pressure gradient of the flow. Typically, a wetted flow within a pipe has an axial pressure gradient of about 1% of a dynamic head per diameter of distance traveled. Consequently, a practical minimum separation distance is likely about ten pipe diameters, although this depends upon the particular system at hand. The pressures measured by the sensors 404, 406 and signals for the array of sensors within the flowmeter 402 are provided to the processor 134, similar to that presented hereinbefore. In response to the input signals, the processor determines and displays a liquid to gas mass ratio (wet gas measurement) of the fluid flow in the pipe 124.

Specifically, the differential pressure determinable by the pressure sensors 404, 406 is a function of parameters such as the velocity of the wet gas mixture, the liquid to gas mass ratio (LGMR), the gas density, the liquid density, the spacing of the sensors 404, 406 over the diameter of the pipe (L/D), the roughness of the interior wall surface of the pipe, and the geometry of the pipe disposed between the pressure sensors (e.g., elbows, contractions/expansions, valves, etc.). For a fixed pipe geometry and gas and liquid densities, however, the difference in pressure (DP) sensed by the pressure sensors 404, 406 are a function of the velocity and the LGMR of the flow. Knowing the velocity of the mixture using the flowmeter 402, the DP then correlates directly with the LGMR. In mathematical terms, the pressure loss across a section of pipe can be related to the flow rate using the Darcy-Weisbach equation (assuming a well mixed flow):

$$\Delta P = f(geo) * \left(\frac{1}{2}\rho_{gas}V_{gas}^2\right) * \left(1 + \left(1 + \frac{\rho_{gas}}{\rho_{liq}}\right)LGMR\right) \quad \text{Eqn. 14}$$

where f(geo) represents a geometric function of the pipe section (e.g., L/D), $\rho_{gas}$ represents the gas density, $V_{gas}$ represents the velocity of the gas, and $\rho_{liq}$ represents the liquid density. This equation can be rearranged for the LGMR:

$$LGMR = \frac{\frac{\Delta P}{\left(\frac{1}{2}\rho_{gas}V_{gas}^2 * f(geo)\right)} - 1}{1 + \frac{\rho_{gas}}{\rho_{liq}}} \quad \text{Eqn. 15}$$

This approach is similar to that shown and described in FIG. 1, with the difference that instead of using a flowmeter which utilizes a flow area change to induce a drop in pressure, the pressure drop associated with the multiphase flow from point A to point B is used (i.e., the pressure drop substantially attributable to frictional and pipe geometry losses). Further as discussed and shown earlier in FIG. 4, the relationship (difference) 410 of the flow rate 414 of the sonar meter 402 and the flow rate 412 determined using the pressure drop between the pressure sensors 404 and 406 may be used to determine the wetness of the mixture (multiphase flow), similar to that discussed hereinbefore.

As shown in FIG. 11, the apparatus 400 may be used to measure the wetness or liquid volumetric flow of a liquid gas mixture provided by an oil well. As shown, one of the pressure sensors 404 may be disposed at or near the well head and the other sensor being disposed at or near a gathering station with the sonar flowmeter 402 disposed therebetween. While the illustration depicts the sonar flowmeter 402 disposed between the pressure sensors 404, 406, the invention is not so limited and the sonar meter 402 may be disposed upstream or downstream of the pair of pressure sensors 404, 406, at any position provided the flowmeter 402 and sensors 404, 406 are not spaced apart so far that the wet gas flow sensed by the sensors is materially different between flowmeter 402 and sensors 404 and 406. Further, the sonar meter 402 may be disposed at any location between the pair of pressure sensors 404, 406.

Figure 12:
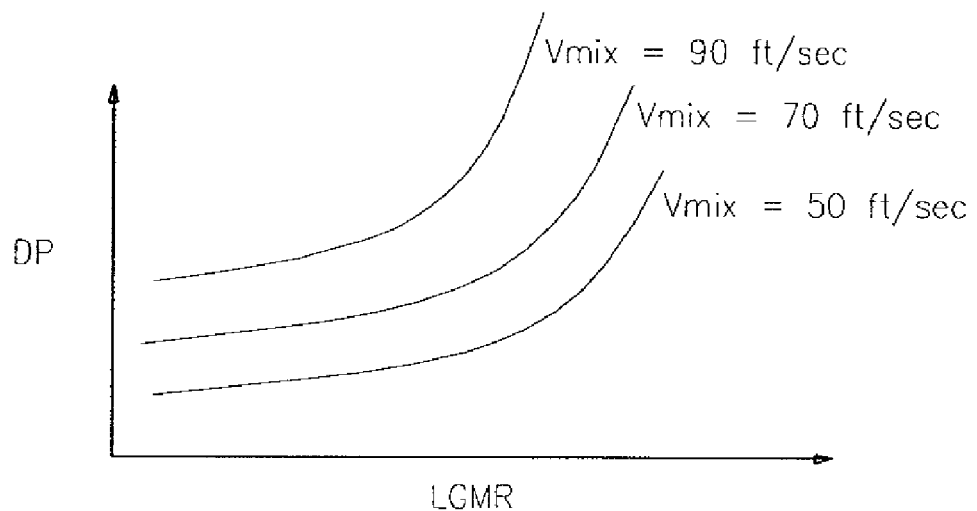
FIG. 12 is a plot of the output of a DP flowmeter as a function of the liquid to gas mass ratio (LGMR) of the flow at different flow velocities in accordance with the present invention.

FIG. 12 shows a diagrammatic graph of differential pressure versus liquid gas mass ratio. The graph includes diagrammatic plots of flow velocity for wet gas flows of 50 ft/sec, 70 ft/sec, and 90 it/sec. The three plots illustrate the sensitivity of the differential pressure to the LGMR parameter and therefore the wetness of the flow, as well as the influence of flow velocity.

Figure 13:
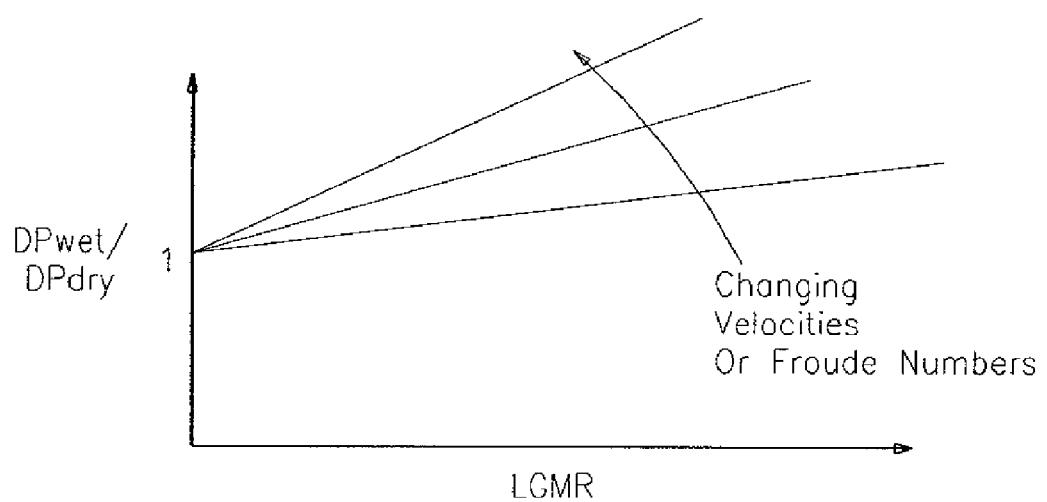
FIG. 13 is a plot of the output of the measured differential pressure of a wet flow over the differential pressure of a dry flow versus the liquid to gas mass ratio (LGMR) in accordance with the present invention.

FIG. 13 shows a diagrammatic graph of the ratio of differential pressure of a wet gas flow over differential pressure of a dry gas flow ($DR_{wet}/DP_{dry}$) versus LGMR. The graph includes three plots of different flow velocities or Froude Numbers, where the uppermost plot represents the highest flow velocity and Froude number. The plots coincide at the $DR_{wet}/DP_{dry}$ value of 1 where the gas flow is completely dry. The plots diverge as a function of the wetness of the flow.

Figure 14:
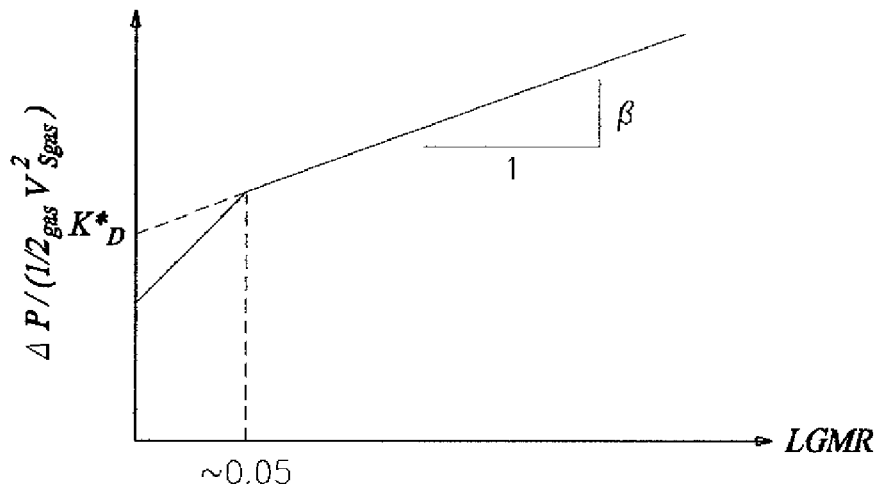
FIG. 14 is a plot of a parametric model of pressure loss as a function of wetness (LGMR).

The above-described embodiment utilizing a flowmeter 402 and pressure sensors 404,406 can be used to create an empirical model to determine the wetness of a gas flow, and/or can be used to create a optimized analytical model for determining the same. The empirical model can be developed from data collected from a given piping system, where pressure loss data as a function of wetness can be determined for sets of constant flow pressure and velocity. The wetness sensitivity can be described graphically (e.g., slope and offset) or in tables. FIG. 14 illustrates a graph of a parametric model of a linear pressure drop as a function of wetness, except for an initial onset of wetness for an LGMR of <~0.05. The empirical model may require in-field calibration for the particular piping system at band.

Figure 15:
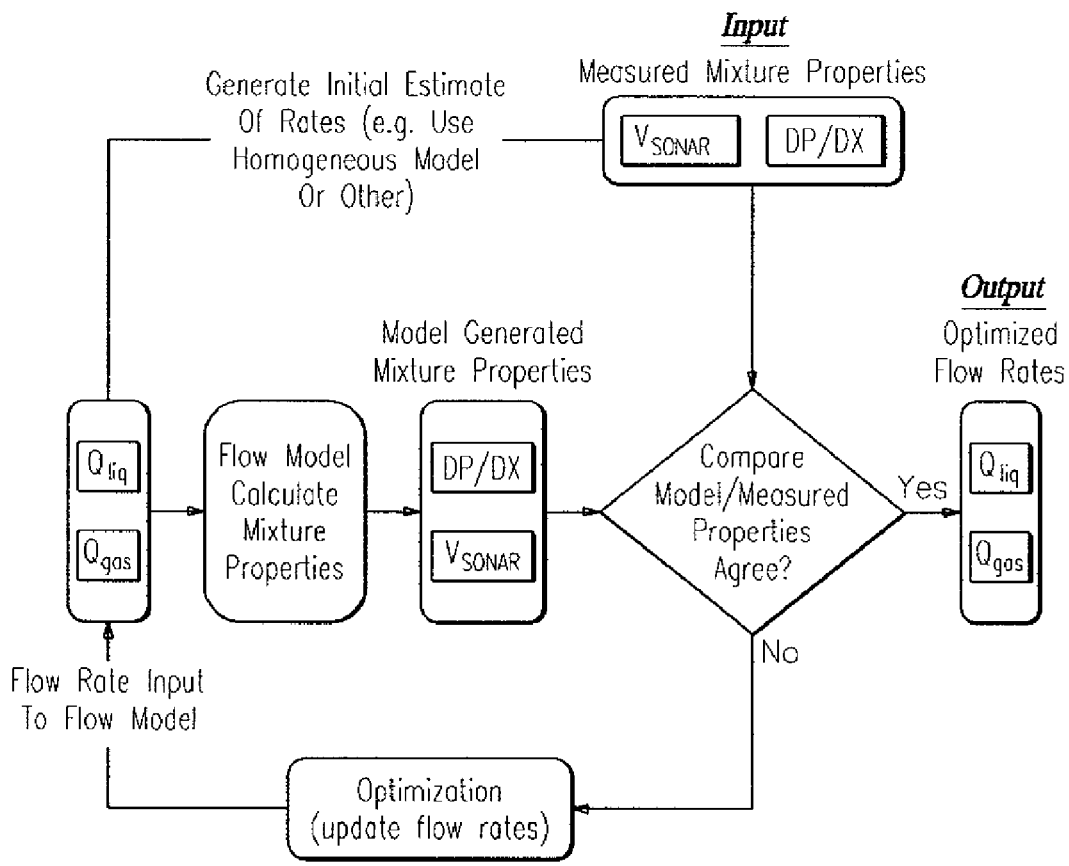
FIG. 15 is a flow diagram illustrating an embodiment of an analytical optimization process.

In the optimized model, initial values of flow velocity ($V_{SONAR}$) and DP (DP/DX) are input into an analytical model such as that described above, for the purpose of generating analytically determined liquid and gas flow rates. The initial values of $V_{SONAR}$ and DP/DX are then compared to the model generated $V_{SONAR}$ and DP/DX. If the delta between the compared values is great enough, the input $V_{SONAR}$ and DP/DX are updated and the process repeated. Once the values are within a predetermined range, the analytical model produces the optimized liquid and gas flow rates. FIG. 15 illustrates a flow chart of an analytical optimization embodiment.

The method of the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus for measuring wetness of a gas flow within a conduit, the apparatus comprising:
   a first pressure sensor operable to sense the pressure of the gas flow within the conduit at a first position;
   a second pressure sensor operable to sense the pressure of the gas flow within the conduit at a second position, which second position is located downstream of the first position an amount sufficient that the gas flow experiences a pressure drop;
   a sonar based flowmeter configured to determine a volumetric flow rate of the gas flow; and
   a processing device in communication with the first and second pressure sensors and the sonar based flowmeter, wherein the processing device is adapted to determine a difference in the pressure sensed by the first and second pressure sensors, and to determine the wetness of the gas flow using the difference in pressure and the volumetric flow rate.

2. The apparatus of claim 1, wherein the sonar based flowmeter includes an array of at least three strain-based sensors.

3. The apparatus of claim 1, wherein said sonar based flowmeter includes an ultrasonic sonar flowmeter.

4. The apparatus of claim 1, wherein the sonar based flowmeter is disposed between the first and second pressure sensors.

5. The apparatus of claim 1, wherein the sonar based flowmeter is disposed either upstream or downstream of the first and second pressure sensors.

6. The apparatus of claim 1, wherein the processor is adapted to determine the wetness of the gas flow using empirical data.

7. The apparatus of claim 6, wherein the empirical data is collected from gas flow traveling within the conduit.

8. The apparatus of claim 1, wherein the processor is adapted to utilize an optimization routine that optimizes flow rates determined by the processor.

9. The apparatus of claim 1, wherein the first and second pressure sensors are sensitive to the wetness of the gas flow and the sonar based flowmeter is relatively insensitive to the wetness of the gas flow, relative to one another.

10. The apparatus of claim 1, wherein the conduit is a pipe.

11. A method of measuring the wetness of a gas flow within a conduit, the method comprising:
    providing a first pressure sensor operable to produce a signal relating to the pressure of the gas flow within the conduit at a first position, a second pressure sensor operable to produce a signal relating to the pressure of the gas flow within the conduit at a second position, which second position is located downstream of the first position, and a flowmeter configured to determine a volumetric flow rate of the gas flow;
    determining a differential pressure value representing a difference in pressure within the gas flow between the first and second positions using the signals from the first and second sensors;
    determining a volumetric flow rate of the gas flow responsive to a differential pressure in the gas flow, using the flowmeter; and
    processing the differential pressure value and the volumetric flow rate to determine the wetness of the gas flow.

12. The method of claim 11, wherein the step of determining a volumetric flow rate includes using signals from an array of sensors disposed at different axial locations along a length of the conduit, wherein the signals are responsive to unsteady pressures caused by coherent structures convecting with the gas flow.

13. The method of claim 11, wherein the step of determining a volumetric flow rate includes determining the volumetric flow rate using at least one sonar based flow meter.

14. The method of claim 13, wherein the at least one sonar based flow meter is an ultrasonic sonar flow meter.

15. The method of claim 11, wherein the processing step includes processing the differential pressure value and the volumetric flow rate to determine the Lockhardt Martinelli (LM) number which is given by, $$LM \equiv \sqrt{\frac{\dot{m}_{liq} Q_{liq}}{\dot{m}_{gas} Q_{gas}}},$$

where, $m_{liq}$ is the liquid mass flow, $Q_{liq}$ is the liquid volumetric flow, $m_{gas}$ the gas mass flow and $Q_{gas}$ is the gas volumetric flow.

16. The method of claim 11, wherein the processor determines the wetness of the gas flow using empirical data.

17. The method of claim 16, wherein the empirical data is collected from gas flow traveling within the conduit.

18. The method of claim 11, wherein the processor includes one or more routines for optimizing liquid and gas flow rates within the gas flow.

19. A method of measuring the wetness of a gas flow within a conduit, the method comprising:

provinding a first sensor operable to produce a signal relating to the gas flow within the conduit at a first position, a second pressure sensor operable to produce a signal relating to the gas flow within the conduit at a second position, which second position is located downstream of the first position, which first and second sensors are sensitive to the wetness of the gas flow, and a flowmeter configured to determine a volumetric flow rate of the gas flow, which flowmeter is insensitive to the wetness of the gas flow relative to the first and second sensors;

determining a differential value representing a difference in a characteristic of the gas between the first and second positions using the signals from the first and second sensors;

determining a volumetric flow rate of the gas flow responsive to a differential pressure in the gas flow, using the flowmeter; and processing the differential value and the volumetric flow rate to determine the wetness of the gas flow.

* * * * *